US012106726B2

(12) United States Patent
Chen

(10) Patent No.: US 12,106,726 B2
(45) Date of Patent: Oct. 1, 2024

(54) BACKLIGHT DEVICE, OPERATION METHOD AND DISPLAY DEVICE FOR REDUCING MOTION BLUR

(71) Applicant: Qisda Corporation, Taoyuan (TW)

(72) Inventor: Min-Jye Chen, Taoyuan (TW)

(73) Assignee: Qisda Corporation, Taoyuan (TW)

(*) Notice: Subject to any disclaimer, the term of this patent is extended or adjusted under 35 U.S.C. 154(b) by 0 days.

(21) Appl. No.: 18/180,143

(22) Filed: Mar. 8, 2023

(65) Prior Publication Data

US 2023/0410758 A1 Dec. 21, 2023

(30) Foreign Application Priority Data

Jun. 17, 2022 (CN) ......................... 202210691392.5

(51) Int. Cl.
*G09G 3/34* (2006.01)

(52) U.S. Cl.
CPC ..... *G09G 3/342* (2013.01); *G09G 2320/0261* (2013.01); *G09G 2320/064* (2013.01)

(58) Field of Classification Search
CPC ........... G09G 3/342; G09G 2320/0261; G09G 2320/06
See application file for complete search history.

(56) References Cited

U.S. PATENT DOCUMENTS

| | | | | |
|---|---|---|---|---|
| 2010/0134406 A1* | 6/2010 | Maruyama | ........... | G09G 3/3426 315/297 |
| 2011/0181202 A1* | 7/2011 | Yu | ........................ | G09G 3/3426 315/297 |
| 2019/0251914 A1* | 8/2019 | Chen | ...................... | G09G 3/342 |
| 2020/0264476 A1* | 8/2020 | Yashiki | ................ | G09G 3/3426 |
| 2021/0233478 A1* | 7/2021 | Sun | ...................... | G09G 3/3426 |

FOREIGN PATENT DOCUMENTS

| | | |
|---|---|---|
| CN | 102142233 | 8/2011 |
| CN | 109712586 | 5/2019 |
| CN | 109712586 A * | 5/2019 |
| KR | 101671514 | 11/2016 |
| KR | 101671514 B1 * | 11/2016 |

* cited by examiner

*Primary Examiner* — Kirk W Hermann

(57) ABSTRACT

A display device is provided. The display device includes a display panel, a scaler integrated circuit, and a backlight device. The backlight device includes N light zones for providing a backlight to the display panel, wherein N is a positive integer. The backlight device lights each of the N light zones in a time-sharing manner in each of a plurality of scan periods. Each of the scan periods has a time length greater than or equal to a time length of a video active data period of the display panel. A continuous lighting time length of each of the N light zones is less than or equal to a quotient of the time length of the video active data period divided by N.

20 Claims, 7 Drawing Sheets

BACKLIGHT DEVICE, OPERATION METHOD AND DISPLAY DEVICE FOR REDUCING MOTION BLUR

CROSS-REFERENCE TO RELATED APPLICATION

This application claims the priority benefit of China application serial no. 202210691392.5, filed on Jun. 17, 2022. The entirety of the above-mentioned patent application is hereby incorporated by reference herein and made a part of this specification.

BACKGROUND OF THE INVENTION

Field of the Invention

The invention relates to an electronic device, and more particularly, to a backlight device, an operation method, and a display device for reducing motion blur.

Description of Related Art

A liquid-crystal display (LCD) is a common hold-type display. That is, for each pixel, the pixel value is maintained until it is updated in the next video frame. Due to this holding feature, an object moving in the screen is static (not moving) until a new screen is updated. When a user views an object in the screen, they expect the object to be in a certain position according to the moving speed of the object. However, due to the holding feature of the liquid-crystal display, a motion blur phenomenon occurs in human vision. Motion blur reduces image quality and may cause viewing discomfort. How to reduce motion blur is one of many technical issues in the art.

SUMMARY OF THE INVENTION

The invention provides a backlight device, an operation method, and a display device to reduce motion blur.

In an embodiment of the invention, a backlight device includes a backlight module and a local dimming circuit. The backlight module includes N light zones for providing a backlight to a display panel, wherein N is a positive integer. The local dimming circuit is coupled to the backlight module for lighting each of the N light zones in a time-sharing manner in each of a plurality of scan periods. Each of the scan periods has a time length greater than or equal to a time length of a video active data period of the display panel. A continuous lighting time length of each of the N light zones is less than or equal to a quotient of the time length of the video active data period divided by N.

In an embodiment of the invention, an operation method includes: lighting each of N light zones of a backlight module of a backlight device in a time-sharing manner via a local dimming circuit of the backlight device in each of a plurality of scan periods to provide a backlight to a display panel, wherein N is a positive integer; adjusting time lengths of the scan periods via the local dimming circuit so that the time length of each of the scan periods is greater than or equal to a time length of a video active data period of the display panel; and adjusting a continuous lighting time length of each of the N light zones via the local dimming circuit, so that the continuous lighting time length of each of the N light zones is less than or equal to a quotient of the time length of the video active data period divided by N.

In an embodiment of the invention, the display device includes a display panel, a scaler integrated circuit (IC), and a backlight device. The scaler IC is coupled to the display panel. The backlight device is coupled to the scaler IC. The backlight device includes N light zones for providing a backlight to the display panel, wherein N is a positive integer. The backlight device lights each of the N light zones in a time-sharing manner in each of a plurality of scan periods. Each of the scan periods has a time length greater than or equal to a time length of a video active data period of the display panel. A continuous lighting time length of each of the N light zones is less than or equal to a quotient of the time length of the video active data period divided by N.

Based on the above, the backlight device of an embodiment of the invention lights up different light zones in a time-sharing manner to provide a backlight to the display panel. By utilizing the technique of lighting the backlight in different regions, the backlight device may reduce the image holding feature of the display panel and alleviate the motion blur issue of the display panel.

In order to make the aforementioned features and advantages of the disclosure more comprehensible, embodiments accompanied with figures are described in detail below.

DESCRIPTION OF THE EMBODIMENTS

Figure 1:
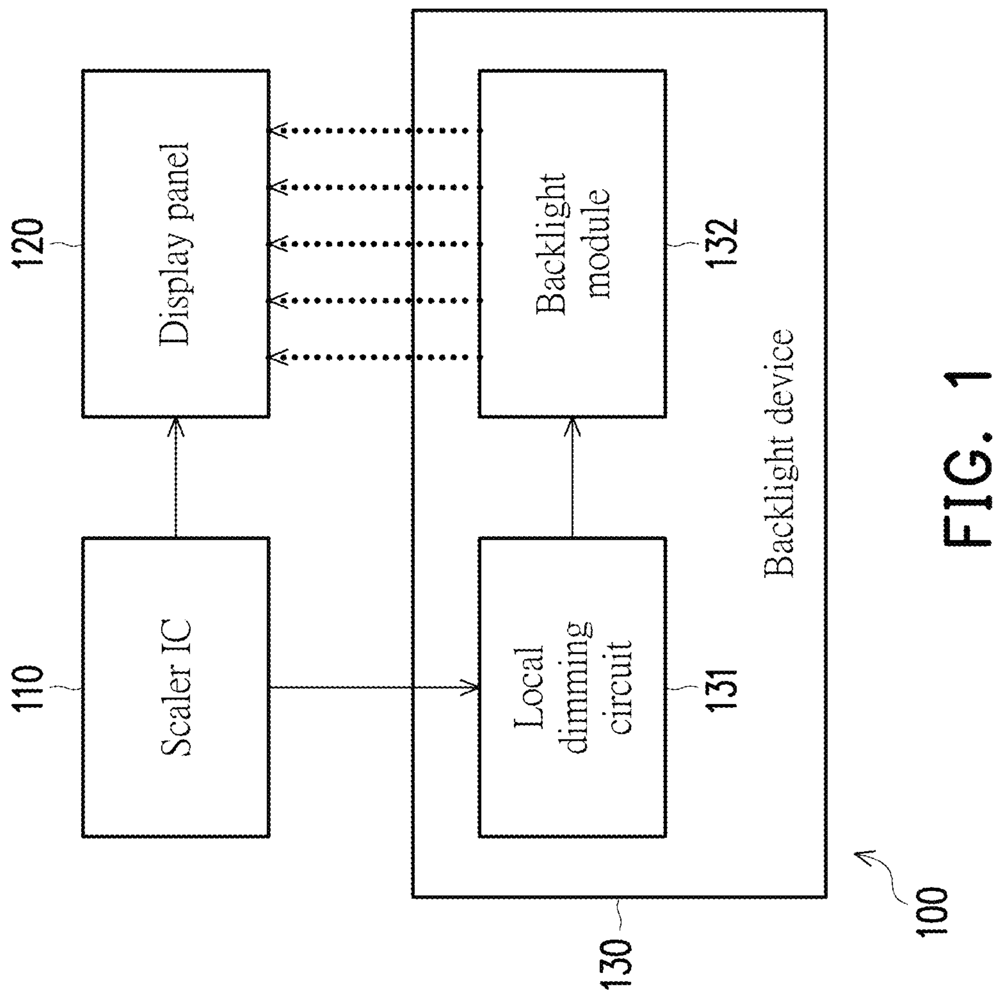
FIG. 1 is a circuit block diagram of a display device according to an embodiment of the invention.

The term "coupled to (or connected to)" used in the entire text of the specification of the present application (including claims) may refer to any direct or indirect connecting means. For example, if the text describes a first device is coupled to (or connected to) a second device, then it should be understood that the first device may be directly connected to the second device, or the first device may be indirectly connected to the second device via other devices or certain connecting means. Terms such as "first" and "second" mentioned in the entire specification of the present application (including the claims) are used to name the elements or to distinguish different embodiments or ranges, and are not used to restrict the upper or lower limits of the number of elements, nor are they used to limit the order of the elements.

Moreover, when applicable, elements/components/steps having the same reference numerals in figures and embodiments represent the same or similar parts. Elements/components/steps having the same reference numerals or having the same terminology in different embodiments may be cross-referenced.

FIG. 1 is a circuit block diagram of a display device 100 according to an embodiment of the invention. The display device 100 shown in FIG. 1 includes a scaler IC 110, a display panel 120, and a backlight device 130. The scaler IC 110 is coupled to the display panel 120. The scaler IC 110 may provide video streaming to the display panel 120 for displaying a screen. The video stream includes a plurality of video frames. Each of the video frames includes a video active data period and a blank period (such as a vertical blank period). In the application of variable refresh rate (VRR), the time lengths of blank periods of different video frames may be different from each other.

The backlight device 130 is coupled to the scaler IC 110 to receive information related to the time length of the video valid data period. In the embodiment shown in FIG. 1, the backlight device 130 includes a local dimming circuit 131 and a backlight module 132. The backlight module 132 includes N light zones for providing a backlight to the display panel 120. In particular, N is a positive integer determined according to actual design. The local dimming circuit 131 is coupled to the backlight module 132 to control/drive each light zone. The local dimming circuit 131 is also coupled to the scaler IC 110 to receive information related to the time length of the video active data period.

Figure 2:
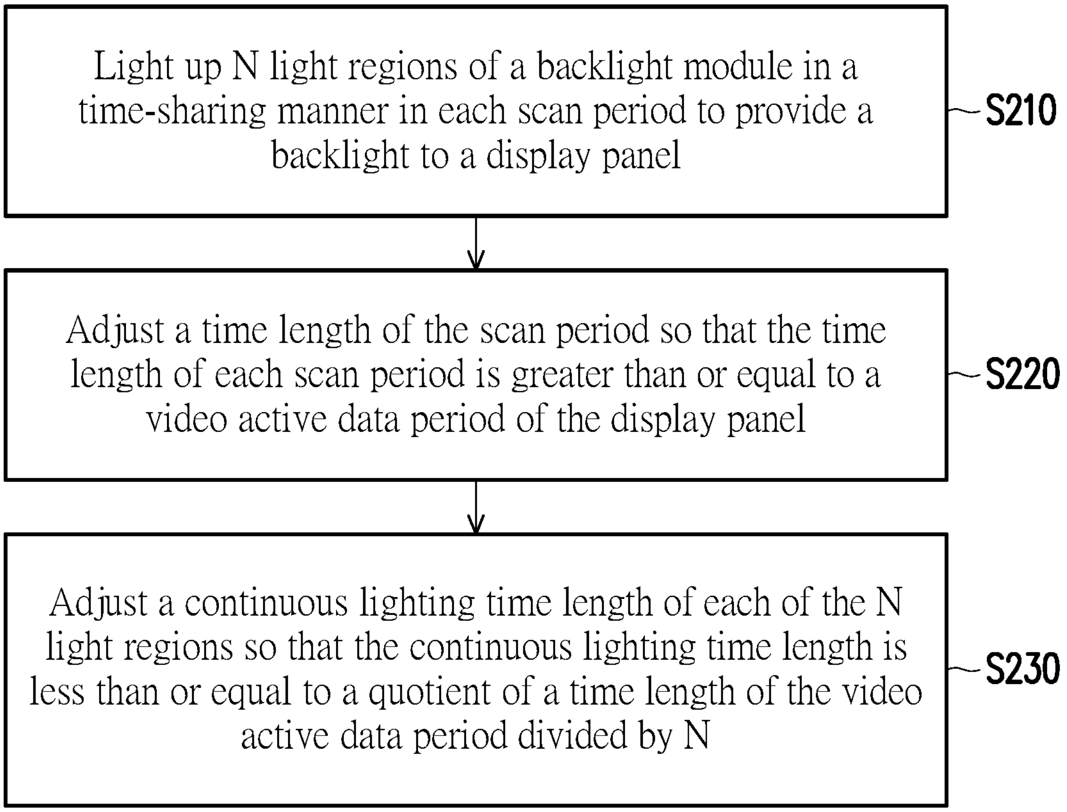
FIG. 2 is a flowchart of an operation method of a backlight device according to an embodiment of the invention.

FIG. 2 is a flowchart of an operation method of a backlight device according to an embodiment of the invention. Please refer to FIG. 1 and FIG. 2. In step S210, the local dimming circuit 131 may light up each of the N light zones of the backlight module 132 in a time-sharing manner in each of the plurality of scan periods to provide a backlight to the display panel 120. For example, if N is 2 (the backlight module 132 is divided into two light zones), the local dimming circuit 131 may light up the first light zone (the second light zone is not lit) in the first half of the first scan period, and then the local dimming circuit 131 may light up the second light zone (the first light zone is not lit) in the second half of the first scan period. After all the light zones of the backlight module 132 are scanned (lighted in a time-sharing manner), the first scan period ends and the second scan period is entered. The operation of the second scan period is similar to that of the first scan period, and is therefore not repeated herein. According to the actual design, in some embodiments, the time lengths of the scan periods of the backlight module 132 are equal to each other.

In step S220, the local dimming circuit 131 may adjust the time lengths of the scan periods so that the time length of each of the scan periods is greater than or equal to the time length of the video active data period of the display panel 120. According to actual design, in some embodiments, the time length of each of the scan periods of the backlight module 132 is longer than or equal to the time length of the video active data period of the display panel 120, and the time length of each of the scan periods of the backlight module 132 is also less than or equal to the time length of the display frame (video frame) of the display panel 120. Therefore, the scan periods of the backlight module 132 may be asynchronous to the display frame (video frame) of the display panel 120. In step S230, the local dimming circuit 131 may adjust the continuous lighting time length of each of the N light zones, so that the continuous lighting time length of each of the N light zones is less than or equal to the quotient of the time length of the video active data period divided by N.

Figure 3:
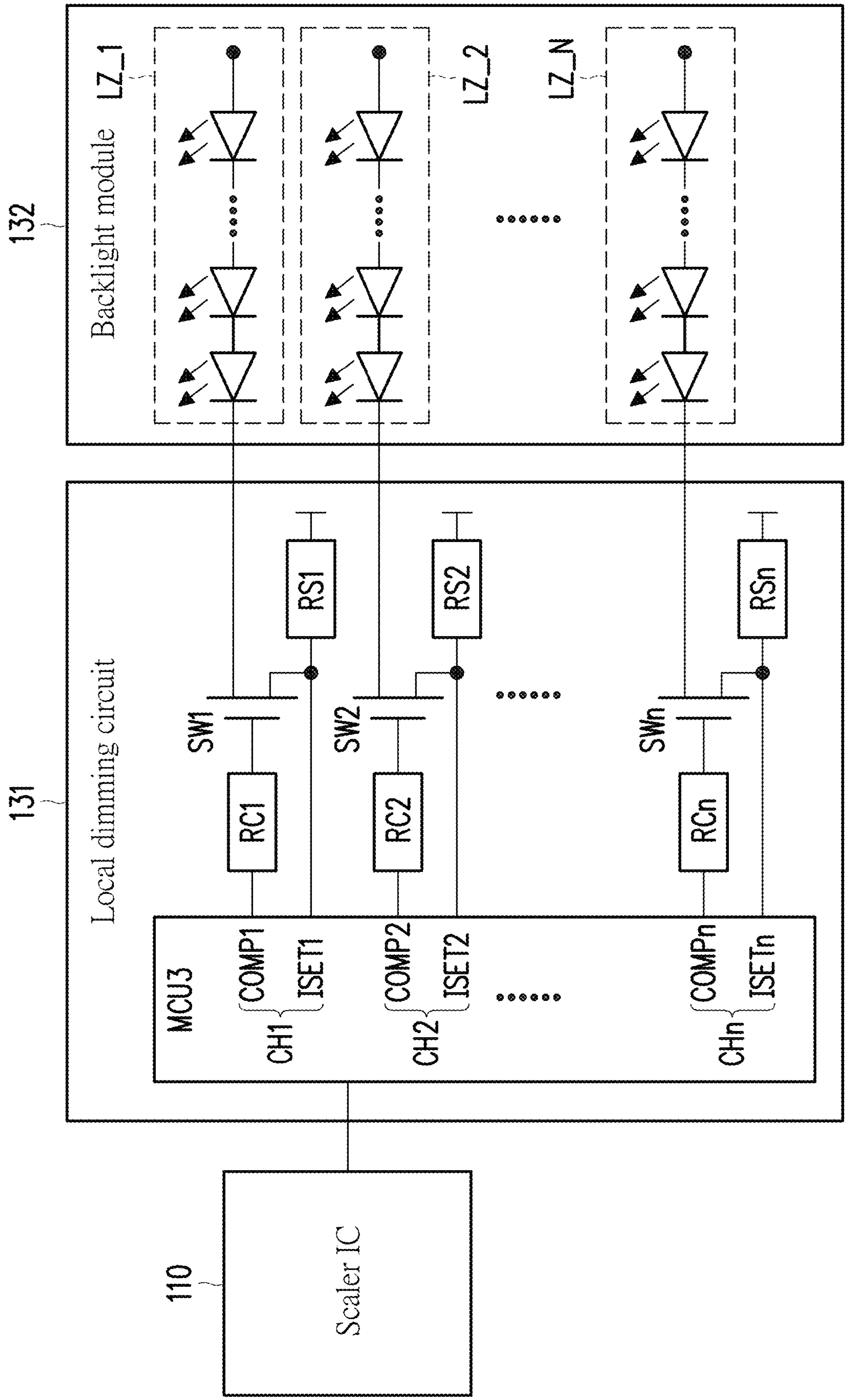
FIG. 3 is a schematic circuit diagram of a local dimming circuit and a backlight module shown according to an embodiment of the invention.

FIG. 3 is a schematic circuit diagram of the local dimming circuit 131 and the backlight module 132 shown according to an embodiment of the invention. In the embodiment shown in FIG. 3, the backlight module 132 is divided into N light zones, that is, light zones LZ_1, LZ_2 . . . LZ_N shown in FIG. 3. Each of the light zones LZ_1 to LZ_N includes different LED strings or other light-emitting elements. The local dimming circuit 131 includes a microcontroller MCU3 and a plurality of drive channels. The microcontroller MCU3 uses a dimming signal CH1 (signals COMP1 and ISET1) to control the first drive channel (a resistor RC1, a switch SW1, and a resistor RS1) to determine the time point, the time length, and the brightness of the light zone LZ_1 to be lit. The microcontroller MCU3 further uses a dimming signal CH2 (signals COMP2 and ISET2) to control the second drive channel (a resistor RC2, a switch SW2, and a resistor RS2) to determine the time point, the time length, and the brightness of the light zone LZ_2 to be lit. By analogy, the microcontroller MCU3 may use a dimming signal CHn (signals COMPn and ISETn) to control the Nth drive channel (a resistor RCn, a switch SWn, and a resistor RSn) to determine the time point, the time length, and the brightness of the light zone LZ_N to be lit.

As shown in FIG. 3, the backlight module 132 is divided into the N light zones LZ_1 to LZ_N arranged in a one-dimensional order from top to bottom, or in a two-dimensional order from left to right and then from top to bottom (Z-shaped). The number of the light zones N may be determined according to actual design. For convenience of description, the following embodiments assume that the entire backlight module 132 is divided into the four light zones LZ_1 to LZ_4.

Figure 4:
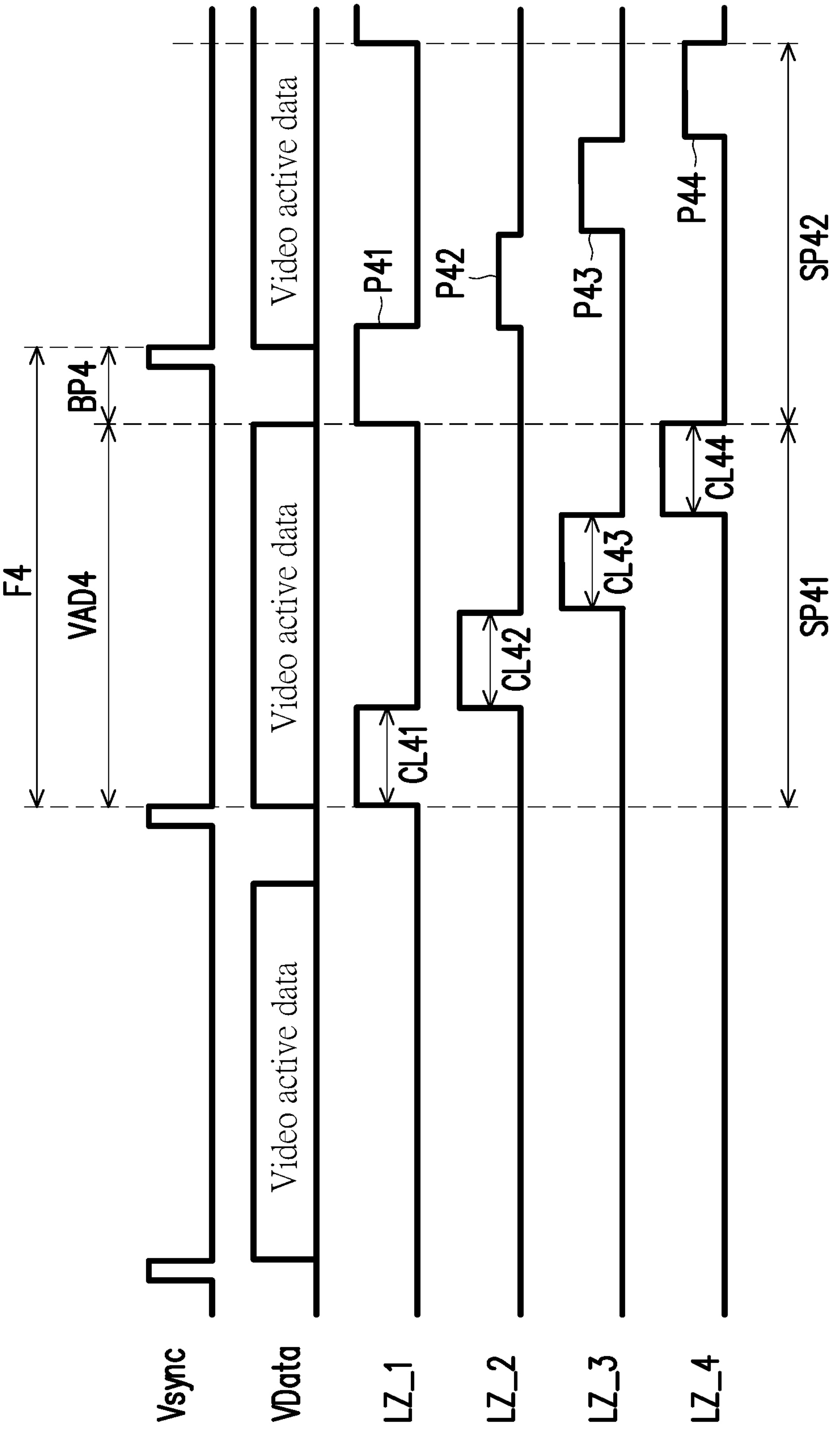
FIG. 4 is a schematic diagram of a driving timing when all four light zones of a backlight module are lit in a time-sharing manner shown according to an embodiment of the invention.

FIG. 4 is a schematic diagram of a driving timing when all four light zones LZ_1 to LZ_4 of the backlight module 132 are lit in a time-sharing manner shown according to an embodiment of the invention. The horizontal axis of FIG. 4 represents time. FIG. 4 shows a vertical synchronization signal Vsync and a video stream VData provided by the scaler IC 110 to the display panel 120. The time length of two adjacent pulses of the vertical synchronization signal Vsync may define the time length of one display frame (e.g., a display frame F4 shown in FIG. 4). Each of the display frames includes a video active data period and a blank period. For example, the display frame F4 shown in FIG. 4 includes a video active data period VAD4 and a blank period BP4. The application scenario shown in FIG. 4 is under the condition of a non-variable refresh rate (VRR), so the time lengths of blank periods of different display frames are substantially the same as each other.

The local dimming circuit 131 may light up all of the four light zones LZ_1 to LZ_4 of the backlight module 132 in a time-sharing manner in each of the scan periods to provide a backlight to the display panel 120. For example, the local dimming circuit 131 may light up all four light zones LZ_1 to LZ_4 at different time points of a scan period SP41 shown in FIG. 4. The curves of the light zones LZ_1 to LZ_4 shown in FIG. 4 represent the time point, the time length, and the brightness when the light zones are lit, wherein the pulse represents that the light zone is lit (non-pulse means the light zone is not lit), the width of the pulse represents the time length of the light zone when lit, and the height of the pulse represents the brightness of the light zone when lit. When any one of the light zones LZ_1 to LZ_4 is lit, the rest of the light zones LZ_1 to LZ_4 are not lit. After all four light zones LZ_1 to LZ_4 of the backlight module 132 are scanned (lighted in a time-sharing manner), the scan period SP41 is ended, and a next scan period SP42 is entered. The operation of the scan period SP42 is similar to that of the scan period SP41, and therefore is not repeated herein. In the embodiment shown in FIG. 4, the time lengths of the scan periods (e.g., SP41 and SP42) of the backlight module 132 are equal to each other.

The local dimming circuit 131 may execute any algorithm according to the actual design to adjust the time lengths of the scan periods (e.g., SP41 and SP42), so that the time length of each of the scan periods of the backlight module 132 is greater than or equal to the time length of the video active data period (e.g., VAD4) of the display panel 120, and the time length of each of the scan periods of the backlight module 132 is less than or equal to the time length of the display frame (e.g., F4) of the display panel 120. Therefore, the scan periods (such as SP41 and SP42) of the backlight module 132 may be asynchronous to the display frame (such as F4) of the display panel 120. The local dimming circuit 131 may execute any algorithm according to actual design to adjust the continuous lighting time of each of the four light zones LZ_1 to LZ_4 of the backlight module 132 (e.g., CL41, CL42, CL43, and CL44 shown in FIG. 4) so that each of the continuous lighting time lengths is less than or equal to the quotient of the time length of the video active data period divided by N (N is assumed to be “4” at this time). For example, assuming that the time length of the video active data period VAD4 is T, each of the continuous lighting time lengths CL41 to CL44 is less than or equal to T/4. In this way, based on the backlight scanning of the backlight module 132 (backlight inserting black), the video active data of each of the display frames is displayed by the backlight module 132 at most once. The present embodiment may ensure that each of the video active data is actually displayed, and may alleviate the motion blur issue of the display panel 120.

In some embodiments, the local dimming circuit 131 may also perform local dimming calculation according to actual design, so as to dynamically adjust the brightness of each of the four light zones LZ_1 to LZ_4 of the backlight module 132. Taking pulses P41, P42, P43, and P44 in the scan period SP42 as an example, the local dimming circuit 131 may perform local dimming calculation to dynamically adjust the heights of the pulses P41 to P44, that is, adjust the respective brightness of the light zones LZ_1 to LZ_4. In other embodiments, the scaler IC 110 may perform a local dimming calculation to control the backlight device 130 to dynamically adjust the brightness of each of the light zones LZ_1 to LZ_4.

Figure 5:
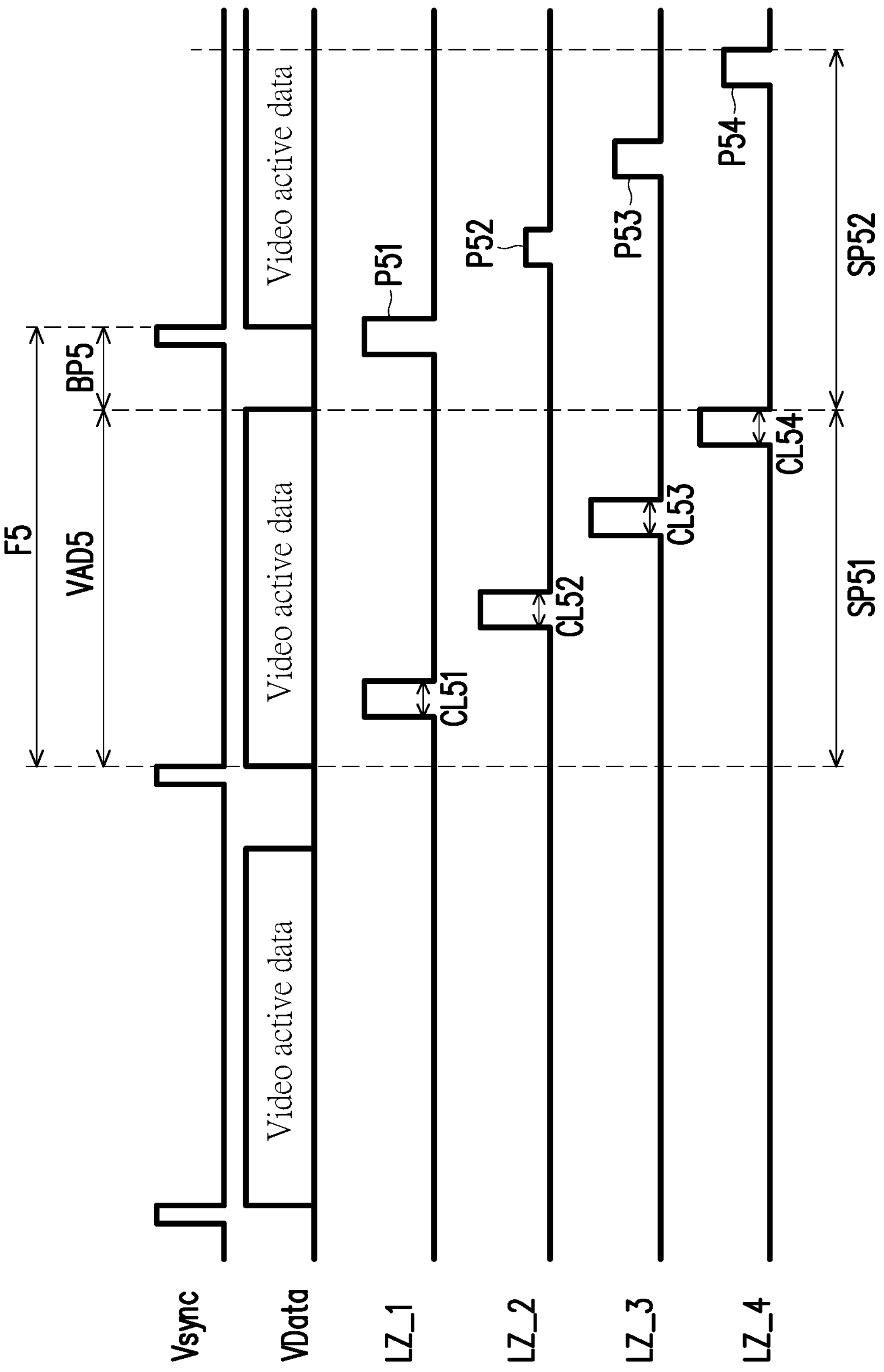
FIG. 5 is a schematic diagram of a driving timing when all four light zones of a backlight module are lit in a time-sharing manner shown according to another embodiment of the invention.

FIG. 5 is a schematic diagram of a driving timing when all four light zones LZ_1 to LZ_4 of the backlight module 132 are lit in a time-sharing manner shown according to another embodiment of the invention. The horizontal axis of FIG. 5 represents time. FIG. 5 shows the vertical synchronization signal Vsync, the video stream VData, a display frame F5, a video active data period VAD5, and a blank period BP5, which are as provided in the related descriptions of the vertical synchronization signal Vsync, the video stream VData, the display frame F4, the video active data period VAD4, and the blank period BP4 shown in FIG. 4 and analogized as such and are therefore not repeated herein. The application scenario shown in FIG. 5 is under the condition of a non-variable refresh rate (VRR), so the time lengths of blank periods of different display frames are substantially the same as each other.

FIG. 5 shows that the local dimming circuit 131 lights the light zones LZ_1 to LZ_4 at different times of a scan period SP51. The curves of the light zones LZ_1 to LZ_4 shown in FIG. 5 represent the time point, the time length, and the brightness of the light zone when lit. After all four light zones LZ_1 to LZ_4 of the backlight module 132 are scanned (lighted in a time-sharing manner), the scan period SP51 is ended, and a next scan period SP52 is entered. The operation of the scan period SP52 is similar to that of the scan period SP51. The curves of the light zones LZ_1 to LZ_4 and the scan periods SP51 and SP52 shown in FIG. 5 are as provided in the related descriptions of the curves of the light zones LZ_1 to LZ_4 and the scan periods SP41 and SP4 shown in FIG. 4 and analogized as such and are therefore not repeated herein. In the embodiment shown in FIG. 5, the time lengths of the scan periods (e.g., SP51 and SP52) of the backlight module 132 are equal to each other. The time length of the scan period SP51 is greater than or equal to the time length of the video active data period VAD5, and the time length of the scan period SP51 is less than or equal to the time length of the display frame F5.

The local dimming circuit 131 may execute any algorithm according to the actual design to adjust the continuous lighting time of each of the four light zones LZ_1 to LZ_4 of the backlight module 132 (e.g., CL51, CL52, CL53, and CL54 shown in FIG. 5) so that each continuous lighting time length is less than or equal to the quotient of the time length of the video active data period divided by N (N is assumed to be “4” at this time). For example, the local dimming circuit 131 may perform black insertion calculation to dynamically adjust the continuous lighting time lengths CL51 to CL54 of the light zones LZ_1 to LZ_4. Or, the scaler IC 110 may perform black insertion calculation to control the backlight device 130 to dynamically adjust the continuous lighting time lengths CL51 to CL54 of the light zones LZ_1 to LZ_4. Based on the backlight scanning of the backlight module 132 (backlight inserting black), the video active data of each of the display frames is displayed by the backlight module 132 at most once, and the issue of motion blur of the display panel 120 may be alleviated.

In some embodiments, the local dimming circuit 131 may also perform local dimming calculation according to actual design, so as to dynamically adjust the brightness of each of the four light zones LZ_1 to LZ_4 of the backlight module 132. Taking pulses P51, P52, P53, and P54 in the scan period SP52 as an example, the local dimming circuit 131 may perform local dimming calculation to dynamically adjust the heights of the pulses P51 to P54, that is, adjust the respective brightness of the light zones LZ_1 to LZ_4. In other embodiments, the scaler IC 110 may perform a local dimming calculation to control the backlight device 130 to dynamically adjust the brightness of each of the light zones LZ_1 to LZ_4.

Figure 6:
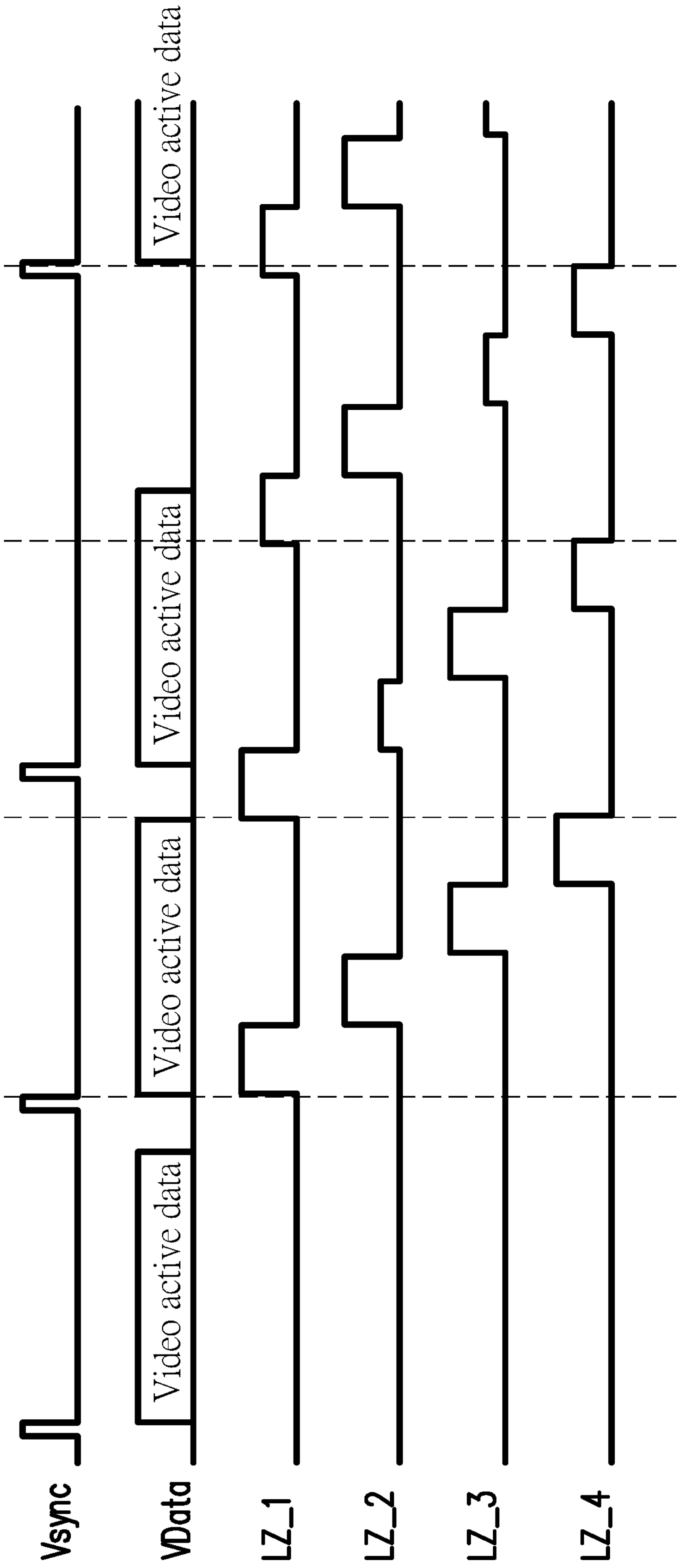
FIG. 6 is a schematic diagram of a driving timing when all four light zones of a backlight module are lit in a time-sharing manner shown according to another embodiment of the invention.

FIG. 6 is a schematic diagram of a driving timing when all four light zones LZ_1 to LZ_4 of the backlight module 132 are lit in a time-sharing manner shown according to another embodiment of the invention. The horizontal axis of FIG. 6 represents time. FIG. 6 shows the curves of the vertical synchronization signal Vsync, the video stream VData, and the light zones LZ_1 to LZ_4, which are as provided in the related descriptions of the curves of the vertical synchronization signal Vsync, the video stream VData, and the light zones LZ_1 to LZ_4 shown in FIG. 4 and may be analogized as such, and are therefore not repeated herein. The difference from the embodiment shown in FIG. 4 is that, the embodiment shown in FIG. 6 is operated in a variable refresh rate (VRR) application environment, so the time lengths of blank periods of different display frames shown in FIG. 6 may be different from each other.

Figure 7:
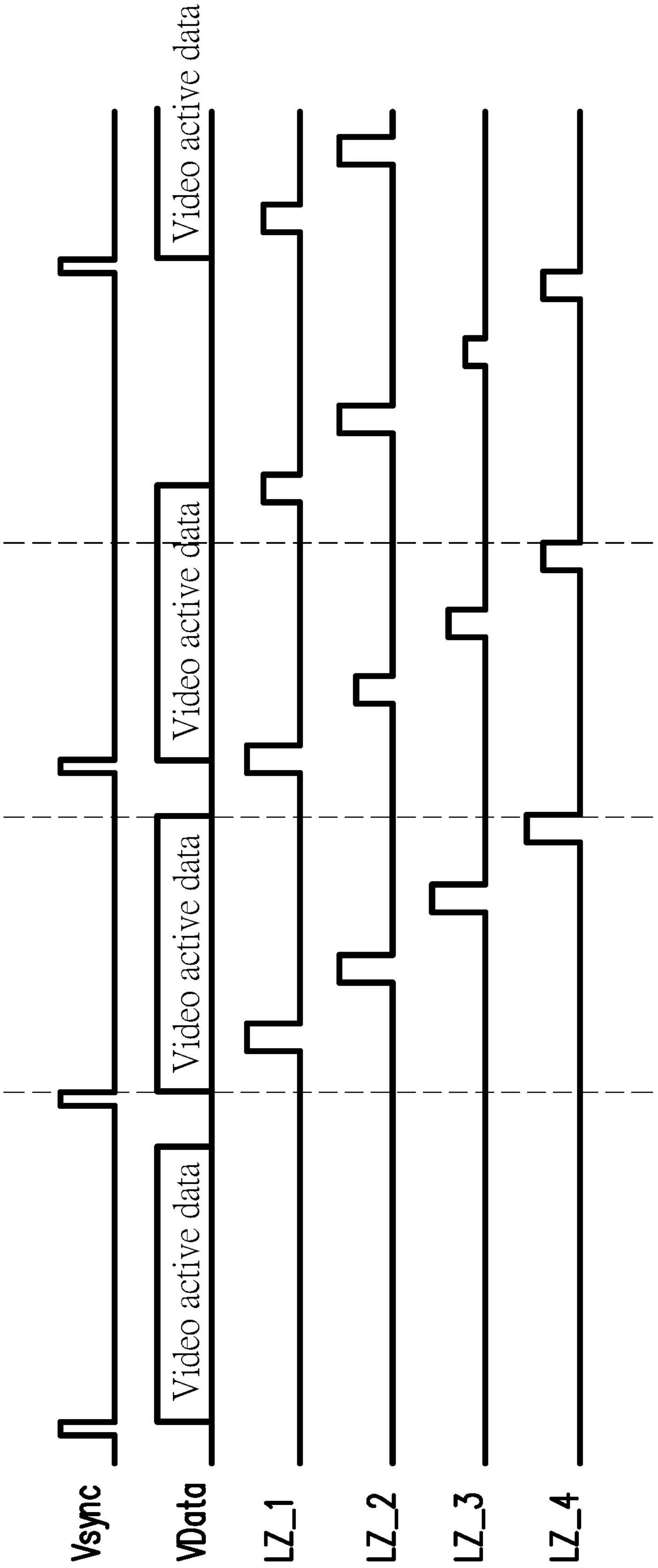
FIG. 7 is a schematic diagram of a driving timing when all four light zones of a backlight module are lit in a time-sharing manner shown according to another embodiment of the invention.

FIG. 7 is a schematic diagram of a driving timing when all four light zones LZ_1 to LZ_4 of the backlight module 132 are lit in a time-sharing manner shown according to another embodiment of the invention. The horizontal axis of FIG. 7 represents time. FIG. 7 shows the curves of the vertical synchronization signal Vsync, the video stream VData, and the light zones LZ_1 to LZ_4, which are as provided in the related descriptions of the curves of the vertical synchronization signal Vsync, the video stream VData, and the light zones LZ_1 to LZ_4 shown in FIG. 5 and may be analogized as such, and are therefore not repeated herein. The difference from the embodiment shown in FIG. 5 is that, the embodiment shown in FIG. 7 is operated in a variable refresh rate (VRR) application environment, so the time lengths of blank periods of different display frames shown in FIG. 7 may be different from each other. Still further, the lighting sequence of the light zones LZ_1 to LZ_4 in FIG. 5, FIG. 6 and FIG. 7 can be adjusted.

Based on the above, the local dimming circuit 131 in the above embodiments lights up different light zones in a time-sharing manner to provide a backlight to the display panel 120. By utilizing the technique of lighting the backlight in different regions, the local dimming circuit 131 may reduce the image holding feature of the display panel 120 and alleviate the motion blur issue of the display panel. Further, the invention is more applicable to the application environment of variable refresh rate (VRR) in addition to the general non-variable refresh rate (VRR) scenario.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An operation method of a backlight device, comprising:
- lighting, by a local dimming circuit of the backlight device, each of N light zones of a backlight module of the backlight device in a time-sharing manner in each of a plurality of scan periods of the backlight module to provide a backlight to a display panel, wherein N is a positive integer;
- adjusting, by the local dimming circuit, time lengths of the scan periods of the backlight module so that the time length of each of the scan periods of the backlight module is greater than a time length of a video active data period of the display panel, wherein a frequency of occurrence of the scan periods of the backlight module is different from a frequency of occurrence of a plurality of display frames of the display panel; and
- adjusting, by the local dimming circuit, a continuous lighting time length of each of the N light zones, so that the continuous lighting time length of each of the N light zones is less than or equal to a quotient of the time length of the video active data period divided by N.

2. The operation method of claim 1, wherein the time lengths of the scan periods are equal to each other.

3. The operation method of claim 1, wherein the time length of each of the scan periods is less than or equal to a time length of a display frame of the display panel.

4. The operation method of claim 1, wherein the scan periods are asynchronous to the plurality of display frames of the display panel.

5. The operation method of claim 1, further comprising:
- performing, by the local dimming circuit, a local dimming calculation to dynamically adjust a brightness of each of the N light zones.

6. The operation method of claim 1, further comprising:
- performing, by the local dimming circuit, a black insertion calculation to dynamically adjust the continuous lighting time length of each of the N light zones.

7. A backlight device, comprising:
- a backlight module comprising N light zones for providing a backlight to a display panel, wherein N is a positive integer; and
- a local dimming circuit coupled to the backlight module for lighting each of the N light zones in a time-sharing manner in each of a plurality of scan periods of the backlight module, wherein a time length of each of the scan periods of the backlight module is greater than a time length of a video active data period of the display panel, a continuous lighting time length of each of the N light zones is less than or equal to a quotient of the time length of the video active data period divided by N, and a frequency of occurrence of the scan periods of the backlight module is different from a frequency of occurrence of a plurality of display frames of the display panel.

8. The backlight device of claim 7, wherein the time lengths of the scan periods are equal to each other.

9. The backlight device of claim 7, wherein the time length of each of the scan periods is less than or equal to a time length of a display frame of the display panel.

10. The backlight device of claim 7, wherein the scan periods are asynchronous to the plurality of display frames of the display panel.

11. The backlight device of claim 7, wherein the local dimming circuit performs a local dimming calculation to dynamically adjust a brightness of each of the N light zones.

12. The backlight device of claim 7, wherein the local dimming circuit performs a black insertion calculation to dynamically adjust the continuous lighting time length of each of the N light zones.

13. A display device, comprising:
- a display panel;
- a scaler integrated circuit (IC) coupled to the display panel; and
- a backlight device coupled to the scaler IC, wherein the backlight device comprises N light zones for providing a backlight to the display panel, N is a positive integer, the backlight device lights each of the N light zones in a time-sharing manner in each of a plurality of scan periods of the backlight device, a time length of each of the scan periods of the backlight device is greater than a time length of a video active data period of the display panel, a continuous lighting time length of each of the N light zones is less than or equal to a quotient of the time length of the video active data period divided by N, and a frequency of occurrence of the scan periods of the backlight device is different from a frequency of occurrence of a plurality of display frames of the display panel.

14. The display device of claim 13, wherein the backlight device comprises:
- a backlight module comprising the N light zones for providing the backlight to the display panel; and
- a local dimming circuit, coupled to the backlight module, for lighting each of the N light zones in a time-sharing manner in each of the scan periods.

15. The display device of claim 13, wherein the time lengths of the scan periods are equal to each other.

16. The display device of claim 13, wherein the time length of each of the scan periods is less than or equal to a time length of a display frame of the display panel.

17. The display device of claim 13, wherein the scan periods are asynchronous to the plurality of display frames of the display panel.

18. The display device of claim 13, wherein the backlight device performs a local dimming calculation to dynamically adjust a brightness of each of the N light zones.

19. The display device of claim 13, wherein the scaler IC performs a local dimming calculation to control the backlight device to dynamically adjust a brightness of each of the N light zones.

20. The display device of claim 13, wherein the scaler IC performs a black insertion calculation to control the backlight device to dynamically adjust the continuous lighting time length of each of the N light zones.

* * * * *